C. S. LOCKWOOD.
Pulmonic Fountain.
No. 212,856. Patented Mar. 4, 1879.
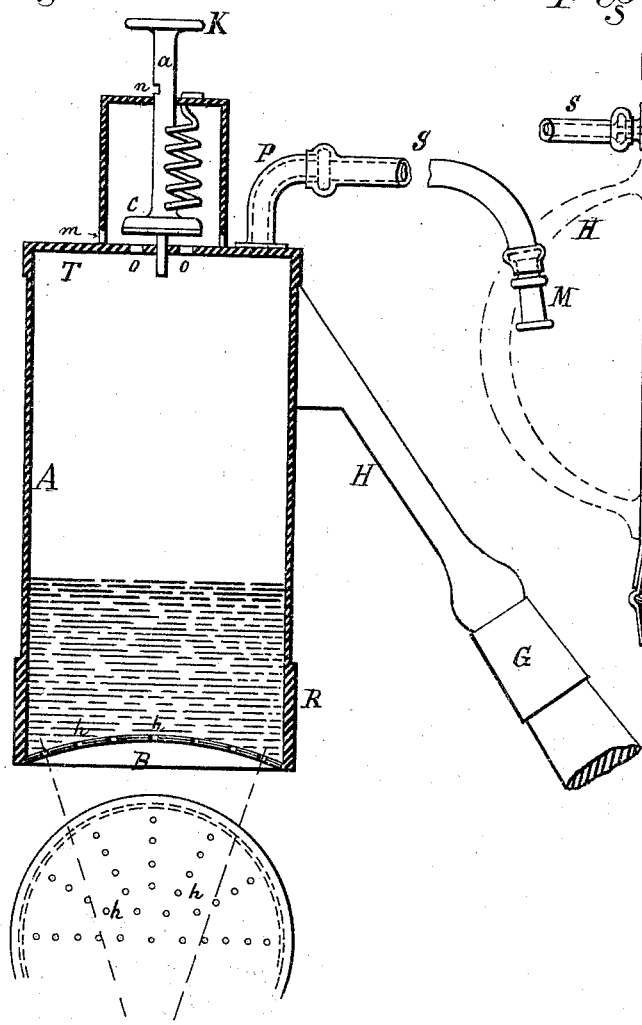
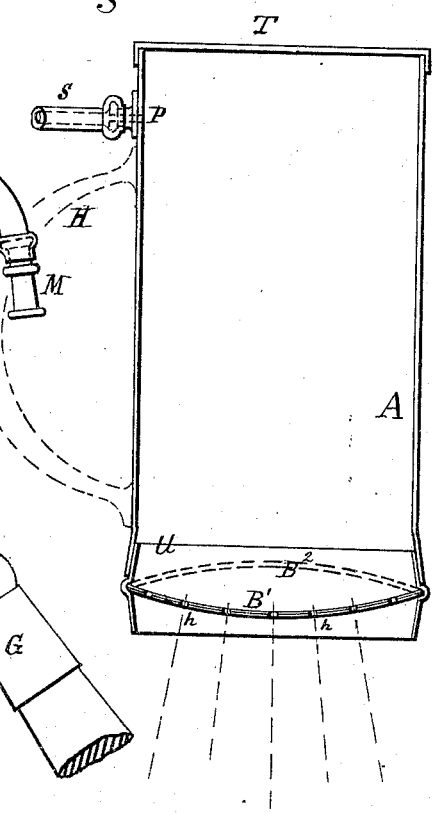
WITNESSES:
James Huxtable
O. W. Gerecke
INVENTOR:
Charles S. Lockwood

UNITED STATES PATENT OFFICE.

CHARLES S. LOCKWOOD, OF NEWBURG, NEW YORK.

IMPROVEMENT IN PULMONIC FOUNTAINS.

Specification forming part of Letters Patent No. 212,856, dated March 4, 1879; application filed January 2, 1879.

*To all whom it may concern:*

Be it known that I, CHARLES S. LOCKWOOD, of Newburg, in the county of Orange and State of New York, have invented a new and Improved Pulmonic Fountain, of which the following is a specification:

The object of my invention is to construct a vessel with perforated bottom, the vessel to hold water, which will not flow out by its own weight through the fine holes in the bottom without artificial pressure on top of the water, which pressure is applied by the person holding the vessel blowing through a flexible tube attached at the top of the vessel. The vessel is tightly closed, so that no air can enter except through the tube or through the perforated bottom; and if the vessel is filled with water and turned bottom downward, no water will escape when the flexible tube is closed between the fingers or a gentle sucking is performed on the tube.

The bottom of the vessel may be straight, convex, or concave, according to its use. For instance, the vessel with convex bottom may be used for a shower-bath, wetting or sprinkling carpets and floors, watering flowers or plants by a fine spray if the surface to be watered is large, and the spray need not be confined to a certain place; but as soon as the spray should be concentrated or confined, the vessel with straight or concave bottom should be used. In this way the fine streams of water converge toward the center or fulcrum of the bottom, and by lifting or lowering the vessel above the object to be watered the streams of water can be confined at pleasure.

I refer to the annexed drawings, in which Figure 1 shows a vertical section of a fountain with fixed concave or inverted bottom. Fig. 2 is a section of a vessel with reversible bottom.

A represents the body of the vessel, which may be made of any suitable material.

The fountain in Fig. 1 has a concave bottom, B, with holes $h\ h$, firmly soldered to the body, with a heavy ring, R, on the outside to make the bottom end of the vessel heavy, so that it, when set in water, will swim bottom down.

In the top head T are holes O O, with a valve, C, covering the holes tight when the stem $a$ is pushed down and locked by the notch $n$ over the edge of the hole through which $a$ is sliding. As soon as the stem is unlocked the spiral spring $i$ pulls the valve up to open the holes O O for air to escape while water is entering through the holes $h\ h$ in bottom B to fill the vessel when it is held in water.

A small elbow or knob, P, to receive a rubber tube, S, with mouth-piece M, is attached to the top of the vessel, and a handle, H, which can be lengthened by a stick or rod thrust into the socket Q, is fastened to the body of the vessel, so that the fountain can be moved about easily, high or low.

The rubber tube S may be of any suitable length, so that it will reach; and if the end M of the tube is kept in the mouth of the person wishing to use the fountain he may make the water flow after closing the valve C over the openings O O by blowing through the tube S, or stop the flow instantly by stopping to blow or by closing the pipe between his fingers.

The vessel shown in Fig. 2 is only another variety of form.

The perforated bottom $B^1$ is fastened in a reversible ring, U, so that the bottom is concave, like $B^2$, or convex, like $B^1$, and fitting tight both ways in the lower part of the vessel A. The top T is fast and closed air-tight, as this vessel can be filled by taking off the bottom U and pouring or dipping water in the vessel. The knob and the tube S are attached at the upper end of the vessel, the handle H, on the side, of any suitable shape.

I am aware that there are vessels or watering-pots in use with closed tops and with straight perforated bottoms, which have an air-hole in the handle, which can be closed by holding a finger over the opening to stop the flow of water; but those vessels do not work satisfactorily. The water runs in a stream, not in a spray, as the holes have to be larger to make the water flow without an artificial pressure behind.

What I claim as my invention, and desire to secure by Letters Patent, is—

The pulmonic fountain consisting of the vessel A, with perforated bottom B, which may be either concave, straight, or convex, handle H, and pulmonic air-tube P S M, substantially as and for the purpose as specified.

CHARLES S. LOCKWOOD.

Witnesses:
 JAMES HUXTABLE,
 F. H. GERECKE.